July 2, 1968     W. S. KAGHAN ETAL     3,391,044
METHOD FOR IMPROVING ELECTRIC GLOW DISCHARGE
TREATMENT OF PLASTIC MATERIALS
Filed April 2, 1962
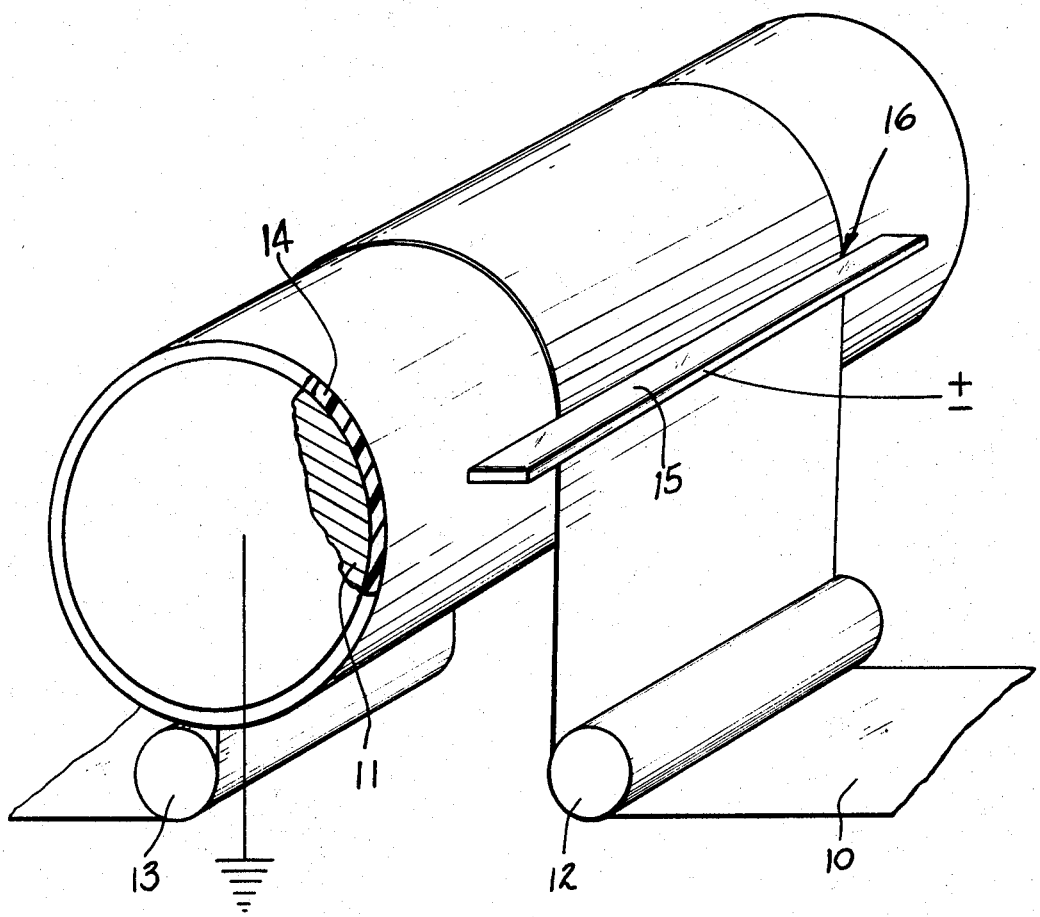
INVENTORS:
WALTER S. KAGHAN
PERCY M. KAY
WILLIAM J. SCHMITT
BY
ATTORNEY

United States Patent Office 3,391,044
Patented July 2, 1968

---

3,391,044
METHOD FOR IMPROVING ELECTRIC GLOW DISCHARGE TREATMENT OF PLASTIC MATERIALS
Walter S. Kaghan, Orange, and William J. Schmitt, Wallingford, Conn., and Percy M. Kay, Chesterland, Ohio, assignors to Olin Mathieson Chemical Corporation, New Haven, Conn., a corporation of Virginia
Continuation-in-part of application Ser. No. 602,506, Aug. 7, 1956. This application Apr. 2, 1962, Ser. No. 184,404
2 Claims. (Cl. 156—272)

This invention relates to a method by which substantial improvement can be obtained in the electric glow discharge treatment of polyolefin, such as polyethylene or polypropylene, structures to improve the anchorage characteristic of a surface thereof. More particularly, the invention is concerned with improving processes and apparatus for treating polyethylene or other thermoplastic film or article to render its surface adherent to printing inks or other coating materials, wherein the surface treatment is accomplished by means of an electric glow discharge, as for example, in accordance with the disclosure of the copending applications of Kaghan and Stoneback, Ser. No. 540,137, filed Oct. 12, 1955, and issued Nov. 11, 1958, as U.S. 2,859,481 and of Berthold and Pace, Ser. No. 359,352 filed June 3, 1953, and issued May 3, 1960, as U.S. 2,935,418. This application is a continuation-in-part of our copending application Ser. No. 602,506 filed Aug. 7, 1956, now abandoned.

The aforementioned patents are concerned with treatments of polyethylene structures for improvement in the anchorage characteristics of surfaces of the latter which involve subjecting the surfaces of the structures to an electric glow discharge or corona discharge either substantially immediately following formation of the polyethylene structures or substantially thereafter. They involve the use of a pair of spaced electrodes, one of which is normally grounded and in the form of a metallic roll, a glow discharge being formed between the electrodes and the polyethylene structure being passed therebetween for subjection to the glow or corona discharge. In order that the treatment be most effective, it is desirable, as pointed out in the aforementioned U.S. 2,859,481, that the current level of treatment be relatively high. Yet arcing must be avoided to prevent damage as by perforation, for example, to the polyethylene structure being treated. Furthermore, the heat sealability and durability of the polyethylene structures must be maintained.

It has been found desirable to provide dielectric covering for the grounded electrode for purposes including the following: to carry out the treatment at the desired high current level additional dielectric resistance to arcing through the polyethylene is necessary, provision must be made to prevent arcing around the polyethylene structure being treated when such structure is of lesser dimension that the corona formed, and the dielectric must be effective to prevent arcing through the polyethylene structure despite differences in thickness across the polyethylene structure and to permit the maintenance of a relatively homogeneous corona without local variations.

The materials employed heretofore for this purpose have involved serious disadvantages. Thus, until the present invention, the most satisfactory ground roll wrap available was "Mylar" (polyethylene terephthalate film). While excellent anchorage characteristics may be obtained by treatment involving the use of a "Mylar" ground roll wrap and the heat sealability maintained at a high level, there were important deficiencies. Mainly, this material deteriorates rapidly under corona discharge so that it becomes useless for the purpose in a matter of hours. Thus, the treating apparatus must be frequently shut down for replacement of the ground roll wrap. The "Mylar" decomposes under continuous attack by corona discharge and the products of decomposition tend to deposit upon the surface of the polyethylene structure being treated. In addition, excessive amounts of through treatment occur which increase the possibility of subsequent offsetting of a coating material such as ink from the treated polyethylene surface to the opposite surface. One or more of these deficiencies of "Mylar" was exhibited in each and every other material investigated and to a greater extent, although such materials were known generally as having good dielectric properties and some of them had been described as corona-resistant.

Thus, efforts to employ paper and paper-board proved to be completely unsatisfactory. A polyethylene covering itself, even at a low current level much below that desired for optimum treatment, had an effective life of only several hours. "Silastic"-impregnated glass cloth manufactured by the Connecticut Hard Rubber Company, while having an improved effective life, permitted excessive amounts of through treatment and decomposed to the extent that a noticeable dusting of the treated film occurred. A tensilized polystyrene, such as "Polyflex," made by Plax Corporation, Hartford, Conn., while providing for substantial improvement of the anchorage characteristic and heat seal strength of a polyethylene structure treated in apparatus employing "Polyflex" as a ground roll wrap was effective for only a few hours, even under a low current level corona discharge. Furthermore, a substantial objectionable through treatment was encountered. "Saran" film proved no better. Mica-coated fiberglass mat material permitted burn-through at low current levels as exemplified by the use of SFG–12 Fiberglass Micanite, manufactured by the Mica Insulator Company, Schenectady, N.Y. Two varieties of mica mat sold under the number designations 73862 and 77851 by General Electric Company also permitted burn-through at lower current levels of treatment than desired for maximum effectiveness of treatment.

Despite its disadvantages, particularly the need for frequent replacement thereof in operation, polyethylene terephthalate film has continued to be used as the dielectric material between one electrode and the plastic under treatment. This is shown in the following publications, for example:

"Electrical Discharge Surface Treatment of Polyethylene Film," H. E. Wechsberg and J. B. Webber, Society of Plastics Engineers, Inc., Technical Papers, vol. 5, pages 84c–1 to 84c–5 (January 1959).

"Surface Treatment of Polyethylene-Coated Paper and Paperboard," by S. Leeds, TAPPI, vol. 44 (April 1961).

"Printing and Decorating Polyolefin Surfaces," by E. E. Smith, Society of Plastics Engineers, Inc., Technical Papers, vol. 8, 13–2, pages 1–10 (January–February 1962).

After extensive research toward improving the electric discharge treatment by overcoming the above and other problems and deficiencies, it has been found that a synthetic rubber manufactured and sold under the trademark "Hypalon" by E. I. du Pont de Nemours and Company, Wilmington, Del., provides the basis for a long-life electrode cover, the use of which provides a notable advance in the art. By its use, polyethylene structures may be more efficiently treated by electric glow or corona discharge treatments, for example those described in the aforementioned patents, with surface anchorage characteristic and heat sealability improvement equal to or superior to any heretofore obtained. It furthermore permits full width treatment of polyethylene products such as film, flattened tubing and the like not heretofore obtainable because of the danger, if the corona extended to the edge of the structure, that arcing around such edge would occur. Furthermore, burn-through of polyethylene structures being treated is eliminated, even at high current levels of treatment. In addition, its use avoids the necessity for frequent replacement of ground roll covering as it withstands the action of even high current level corona discharge and any by-products thereof for periods of at least several months and may indeed be used for years without deterioration in the electric corona discharge treating process.

As illustrated in the accompanying drawing, a polyolefin film 10, which may be polyethylene, polypropylene, or a blend or copolymer of such polyolefins, is drawn under suitably controlled tension over the grounded metal roll 11, being guided thereto and therefrom by suitable idling rolls 12 and 13. Ground roll 11 is provided with an external surface layer 14 of chlorosulfonated polyethylene, as hereinafter described.

Metal electrode 15, which is electrically connected to a suitable source of high voltage, is shorter in length than the ground roll 11 and is also spaced therefrom in order to provide the desired gap 16 between eletcrode 15 and film 10, which is in contact with the surface of layer 14. It will be noted that film 10 may be treated over its entire width by providing electrode 15 of such length as to extend beyond both edges of the film. Under this mode of operation, which is preferred, the corona discharge effects the desired modification of the entire exposed film surface from edge to edge, the portions of the corona discharge impinging beyond the film edges against the ground roll being without deleterious effect when the ground roll is provided in accordance with this invention with a surface layer of chlorosulfonated polyethylene.

"Hypalon" synthetic rubber is chlorosulfonated polyethylene, a long-chain polymer whose molecular structure is represented as follows:

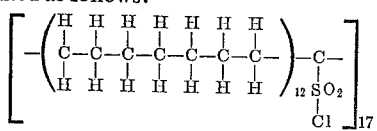

It is made by reacting polyethylene with chlorine and sulfur dioxide to produce a vulcanizable synthetic rubber. By combining the polymer with properly selected compounding ingredients used in the rubber industry, a compound can be produced which can be extruded, calendered or molded.

It has been found that best results for the purposes of this invention are obtained when the chlorosulfonated polyethylene is compounded with a non-conductive finely-divded synthetic or natural pigment such as blanc fixe (precipitated barium sulfate), titania, clay, or talc, a plasticizer such as hydrogenated rosin or rosin ester, litharge, and other customary rubber ingredients such as vulcanization accelerators. For example, a composition suitable for an electrode covering may be prepared in accordance with milling procedure customary in the rubber industry, using 100 parts by weight of the chlorosulfonated polyethylene, 40 parts of litharge (advantageously premixed with a portion, about 7 parts by weight of the above polymer), 100 parts of blanc fixe, 2.5 parts of hydrogenated rosin, 30 parts of mineral oil, 0.5 part of benzothiazyl disulfide, and 0.75 part of dipentamethylene-thiuram-tetrasulfide, all parts being by weight. Preferably, the compound is vulcanized by steam cure in an autoclave. A suitable coating, thus prepared had a content of chlorosulfonated polyethylene amounting to about 65% by volume, a specific gravity of about 2.10, and displayed a durometer hardness (Shore A) of about 80. The metal electrode to be covered is first preferably ground or otherwise prepared to the desired dimensions and sandblasted to provide a suitable surface for the coating, the object being to provide a microscopically roughened surface while avoiding burrs or other projecting areas. The coating should be somewhat thicker than eventually required, the excess material being removed after vulcanization.

It has been found that a covering of such material for the ground roll or grounded electrode having a thickness of at least about 0.05 inch and not more than about 0.25 inch will give satisfactory results. Coatings thicker than 0.25 inch provide no added advantage while effecting an appreciable reduction in the maximum treating current available. Coatings less than 0.05 inch thick may be used but impose more rigid requirements in the manufacture and assembly to insure the absence of thinner areas and of pinholes. Best results and longest life will result from use of a covering of such a compound having a thickness of about 0.125 inch. This thickness is readily provided and furnishes all the advantageous features desired. Among other advantages, it is sufficient to insure substantially constant treating conditions during the surface treatment of film despite local variations in thickness which may occur in such film.

The use of a covering of "Hypalon" compound for the grounded electrode in any of the methods and apparatus disclosed by the aforementioned patents eliminates practically all danger of burn through of a polyethylene structure treated by subjection to the high energy glow or corona discharge. It also results in the formation of a homogeneous corona free from local sparks or arcs such as occur when a ground roll is employed without covering or with one of the aforementioned coverings heretofore tried. The "Hypalon" compound covering of the grounded roll furthermore permits the use of higher level current treatments without damage or perforation of the film. The desirability of such treatment is discussed at length in the aforementioned U.S. 2,859,481. The resulting treated polyethylene structure exhibits an excellent surface anchorage characteristic as well as good heat sealability. This is so both immediately after treatment as well as after extended periods of storage of the treated film.

As disclosed above, the use of a chlorosulfonated polyethylene electrode covering permits the treatment of the full width of the polyethylene structure to be treated. Heretofore the length of the treating electrode and the corona discharge was limited to less than the width of the polyethylene structure under treatment to prevent arcing beyond the extremes of the polyethylene structure which resulted in unsatisfactory treatment. Now, however, the treating electrode as well as the corona discharge therefrom may extend beyond the edges of the polyethylene or like structure passed therebeneath. Thus, polyethylene structures of varying width may be treated without change in the apparatus employed and the additional coverings that were heretofore employed in certain instances to avoid arcing beyond the edges of a polyethylene structure being treated by an electrode of greater length than the width thereof may be omitted.

The electric discharge treatment should preferably be carried out in accordance with the above-mentioned patents, which disclose treatment by an A.C. corona discharge formed between a narrow electrode and a rotating grounded roll, at a frequency of 500 to 17,500 cycles per second, for example about 3,000; over a gap of 0.02 to 0.06 inch, for example about 0.03 inch; and at a secondary voltage of 3,000 to 22,000 volts, for example about 10,000 volts. The current in the electrode circuit may amount to 0.125 amperes or higher. Excellent adhesion of printing ink is obtainable within the aforesaid limits with the use of a secondary peak-to-peak voltage of 21,000 volts, with the peak-to-peak primary voltage being 490 volts and the primary current being 1.4 amperes. A more energetic treatment is preferred for anchorage of a polymeric coating, corresponding values being 30,000 volts in the secondary and 740 volts in the primary, with the primary current at 2.3 amperes.

The electrode covering in accordance with this invention is also applicable with advantage to other electric discharge treatments, both A.C. and D.C. by providing the grounded electrode with a similar coating based on chlorosulfonated polyethylene over the surface facing the other electrode. Thus, the provision of such a coating over the ground roll in a 60 cycle treatment in which the other electrode is a parallel metallic surface spaced ⅛ to ¼ inch away effects significant improvements in the treatment and overcomes difficulties similar to those above described.

Thus, the main objective of the invention in providing an electrode covering capable of withstanding the continuous high intensity corona discharge of the treating process without breakdown has been accomplished. While other materials as listed above were known to have good dielectric strength and a number of them have been described as having corona resistance, chlorosulfonated polyethylene material within the specified thickness limits appears to be unique in displaying a useful lifetime under high intensity corona discharge in excess of many months or even years. In the case of electrical wire insulation, corona resistance is regarded as excellent when no visible damage occurs as a result of exposure for a number of hours to a potential drop amounting to 100 volts per one-thousandth inch of the insulation thickness. However, materials such as silicone rubber, which have been characterized following such tests as showing extraordinary resistance to corona, deteriorate and become useless in a matter of hours when subjected to the continuous high intensity corona discharge of the above-described treating processes. As shown in U.S. 2,870,044 to Blatz, the dielectric life under corona discharge at a potential of 1,000 volts per mil of polyethylene terephthalate film provided with special coatings, while greatly improved as compared to uncoated film, was determined to be several hundred hours at the most.

Accordingly, the establishment of the durability of chlorosulfonated polyethylene material to continuous high intensity corona discharge for extended periods in excess of several months or years was unpredictable from prior information and constituted a most surprising result in view of the failures encountered with other materials, as mentioned above, which were known to have generally excellent dielectric properties.

The obtainment of other significant advantages in addition to the durability, in processes carried out in accordance with this invention, was likewise unpredictable. These include the formation of a corona discharge of homogeneous pale blue color, which is substantially free from local sparks and arcs; which substantially eliminates the occurrence of any burn-through of the thermoplastc film treatment; which enables the treatment to be limited to the exposed surface of the film; which enables the treatment of the full width, from edge to edge, of the thermoplastic film or flattened tubing; and which enables the successive treatment of film or tubing of varying widths without the need for any change or adjustment of the treating apparatus.

The above advantages are obtained in the treatment of polyethylene and like articles or film by processes in accordance with this invention, wherein a corona discharge of high intensity is established at a potential of at least 3,000 volts and up to about 30,000 volts or higher between spaced electrodes, at least one of which is provided with a surface layer 0.05 to 0.25 inch in thickness of chlorosulfonated polyethylene material. The electrode spacing should preferably be such as to provide a gap of 0.02 to 0.06 inch, but generally should not be in excess of about 0.25 inch.

It will also be understood that the advantages of this invention are obtainable with the use of a pair of stationary electrodes wherein the grounded electrode is coated in accordance with this invention on the side facing the other electrode, the film under treatment being subjected to corona discharge while being passed between the electrodes in contact with the chlorosulfonated polyethylene coating. Other modifications may be made without departing from the scope of the invention as defined in the appended claims.

We claim:
1. In the preparation of a polyolefin film having a surface rendered adherent to coating compositions by treatment with a high energy corona discharge between a pair of closely spaced substantially parallel electrodes one of which is grounded, one of said electrodes being a metallic roll and the other being a narrow elongated electrode,
   the process comprising providing one of said electrodes with a surface layer 0.05 to 0.25 inch in thickness of vulcanized chlorosulfonated-polyethylene having a non-conductive finely-divided pigment incorporated therein as an essential ingredient,
   establishing a corona discharge at a potential of about 3,000 to 30,000 volts between the said electrodes,
   and passing said film through said discharge while in contact with the said surface layer.

2. In the preparation of a polyolefin film having an entire surface rendered adherent to coating compositions by treatment with a high energy corona discharge between a pair of closely spaced substantially parallel electrodes, one being a narrow elongated electrode longer than the width of said film and the other being a grounded metallic roll of greater length than the narrow electrode,
   the process comprising providing the grounded electrode with a surface layer 0.05 to 0.25 inch in thickness of vulcanized chlorosulfonated-polyethylene having a non-conductive finely-divided pigment incorporated therein as an essential ingredient,
   establishing a corona discharge at a potential of about 3,000 to 30,000 volts between the said electrodes, said discharge extending across the width of said film and beyond its edges, and passing said film through said discharge while in contact with the said surface layer.

References Cited

UNITED STATES PATENTS 2,864,756   12/1958   Rothacker.

FOREIGN PATENTS 510,068   7/1952   Belgium.
159,822   11/1954   Australia.

OTHER REFERENCES

Hypalon S-2, A New Elastomer, by Dr. Warner, Rubber Age, vol. 71, No. 2, May 1952, pp. 205-221.

Hypalon S-2, Du Pont pamphlet on Prop & Processing Techniques, No. X-32, "Electrical Properties," on pages 10 and 11.

JACOB H. STEINBERG, *Primary Examiner.*

J. STEINBERG, *Examiner.*